Patented July 2, 1935

2,006,740

UNITED STATES PATENT OFFICE 2,006,740

AZO DYESTUFFS

Hans Krzikalla, Ludwigshafen-on-the-Rhine, and Bernhard Eistert, Mannheim, and Robert Schmitt, Darmstadt, and Herbert Kracker, Frankfort-on-the-Main-Hochst, Germany, assignors to General Aniline Works, Inc., New York, N. Y., a corporation of Delaware No Drawing. Application December 6, 1933, Serial No. 701,232. In Germany December 13, 1932

13 Claims. (Cl. 260—76)

The present invention relates to new water-insoluble azo dyestuffs and a process of producing same.

We have found that valuable water-insoluble azo dyestuffs are obtained by coupling with a diazo compound which is free from groups causing solubility in water (i. e. free from sulphonic and carboxylic acid groups) an ortho-hydroxy carboxylic acid arylide corresponding to the general formula

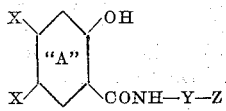

wherein Y stands for an aryl radical, Z for a substituent containing a group capable of enolization and wherein to the benzene nucleus marked "A" a nuclear system containing at least one nucleus is attached in the positions marked X, The group Z may be for example

—CO—CH₂—CO—CH₃,
—NH—CO—CH₂—CO—CH₃,
—CO—CH₂—CO—NH—R (wherein R represents an aryl radical) and pyrazolone radicles such as the radicle of methyl-pyrazolone.

The said coupling components are capable of coupling in two positions, namely in the hydroxylated nucleus and in the group capable of enolization.

As suitable ortho-hydroxy carboxylic acids from which the above acid arylides are derived may be mentioned 2,3-hydroxynaphthoic acid, 2,3-hydroxy-anthracene carboxylic acid, ortho-hydroxy-carbazole carboxylic acids, ortho-hydroxy indole carboxylic acids and similar ortho-hydroxy carboxylic acids suitable for the preparation of development dyestuffs. The said acids may be substituted, for example, by hydroxyl or alkoxyl groups.

Ortho-hydroxy carboxylic acid arylides which are very suitable for the purposes of the present invention are those derived from 2,3-hydroxy naphthoic acid, for example para (2′,3′-hydroxy-naphthoylamino)-benzoylacetic acid anilide

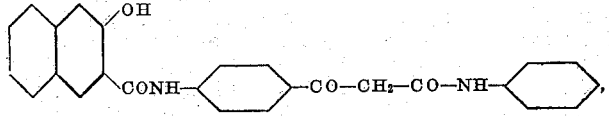

para (2′,3′-hydroxy-naphthoylamino)-benzoylacetone

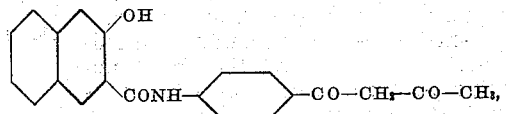

1-(2′,3′-hydroxy-naphthoylamino)-4-(acetoacetyl-amino)-benzene

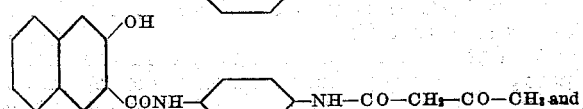

1-[4′-(2″,3″-hydroxynaphthoylamino)-phenyl]-3-methyl-5-pyrazolone

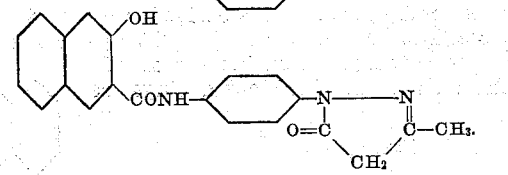

The corresponding compounds containing an anthracene radicle instead of the naphthalene radicle shown are very suitable also.

The ortho-hydroxy carboxylic acid arylides of the kind defined above when applied in alkaline solutions possess a substantially better affinity to the fibre than ortho-hydroxy carboxylic acid arylides free from groups capable of enolization and are much more fertile than the latter. In consequence of the presence of two groups capable of coupling in the molecule (each of which when present alone would yield dyeings of different shades by development with the same diazo compound) the said compounds enable the dyer to obtain shades which could not be prepared in such a simple manner hitherto. Depending on the diazo compound used red or brown to black dyeings are obtained which excel in very good fastness properties. The ortho-hydroxy carboxylic acid arylides of the kind defined above may be prepared by causing the corresponding ortho-hydroxy carboxylic acids, their anhydrides, esters or halides to react with primary or secondary aromatic amines containing a group capable of enolization. The reaction may be effected in the presence of solvents such as toluene or pyridine. The dyestuffs may be prepared in the presence of the fibre in the manner usual in the production of development dyestuffs, the fibre being first soaked with a solution of the coupling component and subsequently handled in a bath containing an excess of the diazo compound. It is preferable to effect the coupling in alkaline solutions. The dyestuffs may also be prepared in the absence of fibres whereby valuable pigments are formed.

The following examples will further illustrate the nature of this invention but the invention is not restricted to these examples.

*Example 1*

Cotton yarn is bottomed in the usual manner with an aqueous solution containing per liter 2 grams of para-(2',3'-hydroxynaphthoylamino)-benzoyl-acetic-acid-anilide (obtainable by condensing para - aminobenzoylacetic-acid-anilide with 2,3-hydroxynaphthoic acid chloride), 4 cubic centimeters of an aqueous solution of sodium hydroxide of 28° Bé strength and 10 cubic centimeters of Turkey red oil. The yarn bottomed is introduced, if desired after rinsing for a short time, into a bath containing 3 per cent of the diazonium chloride of 4-amino-4'-methoxy-diphenylamine. After soaping and rinsing a deep black dyeing of good fastness properties is obtained.

If the yarn bottomed as described in the preceding paragraph is handled in a bath containing 4 per cent of the diazonium chloride of 3-amino-4-methoxy-6-benzoylamino-1-methylbenzene or 2.5 per cent of the diazonium chloride of 1-amino-4-nitrobenzene, dyeings of beautiful fast red-brown shades or of strong red shades respectively are obtained.

If cotton yarn is treated as described in the first paragraph of the present example while replacing the coupling component described therein by the corresponding compounds derived from 2,3-hydroxy carbazole carboxylic acid or 2,3-hydroxyanthracene carboxylic acid instead of 2,3-hydroxynaphthoic acid, similar black dyeings are obtained.

*Example 2*

1 molecular proportion of 1-[4'-(2'',3''-hydroxynaphthoylamino) - phenyl] - 3 - methyl-5-pyrazolone (obtainable by condensing 1-(para-aminophenyl)-3-methyl-5-pyrazolone with 2,3-hydroxynaphthoic acid chloride) is coupled in an alkaline medium with 1 molecular proportion of diazotized 1-amino-4-nitrobenzene. A yellow-red dyestuff precipitates which may be used as a pigment.

*Example 3*

Cotton yarn is bottomed in a similar manner as described in Example 1 while using a bath containing per liter 2 grams of meta-(2',3'-hydroxynaphthoylamino) - benzoyl-acetic-acid-2.4-dimethoxy-5-chloranilide corresponding to the formula

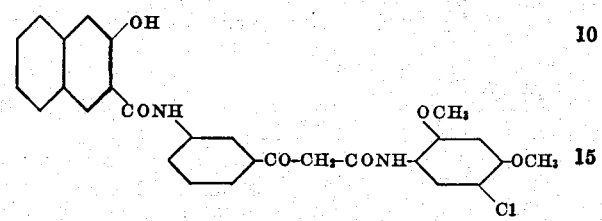

(obtainable by condensing meta-aminobenzoyl-acetic-acid-2.4-dimethoxy - 5 - chloranilide with 2,3-hydroxynaphthoic acid chloride). By development by means of a solution containing 5 per cent of the diazonium chloride of 4-amino-3-methoxy-diphenylamine, a dyeing of strong yellow-brown shade is obtained which possesses very good fastness to washing and boiling with sodium carbonate solution. If development is effected with a solution containing 4 per cent of the diazonium chloride of 3-amino-4-methoxy-6-benzoylamino-1-methylbenzene red-brown shades of similar fastness properties are obtained.

*Example 4*

Cotton yarn is bottomed in the manner described in Example 1 by means of a solution containing per liter 0.7 gram of 1-(2',3'-hydroxynaphthoylamino)-4-(acetoacetylamino)-benzene corresponding to the formula

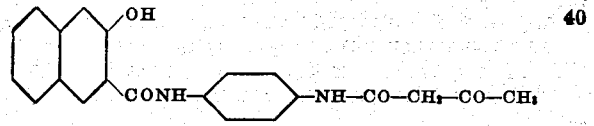

(obtainable by condensing aceto-acetic-acid-para-aminoanilide with 2,3-hydroxynaphthoic acid chloride). By development with a diazo solution containing 3 per cent of diazotized 1-amino-2-methoxy-benzene-5-sulphonic - acid-diethylamide strong fast red shades are produced.

*Example 5*

Cotton yarn is bottomed as described in Example 1 by means of a solution containing per liter 1 gram of 1-(2',3'-hydroxy-naphthoylamino)-3-acetoacetylamino-benzene obtainable by condensing aceto-acetic-acid-meta-aminoanilide with 2,3-hydroxy-naphthoic acid chloride and corresponding to the formula

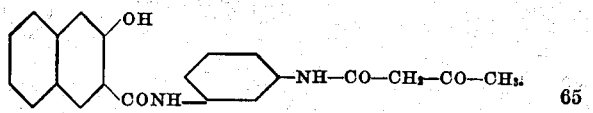

Development is then effected by means of a 4 per cent solution of the diazonium chloride of 1-amino-2.5-dichlorbenzene. A dyeing of brilliant orange shade of good fastness is obtained.

What we claim is:—

1. The process of producing water-insoluble azo dyestuffs which comprises coupling with an aromatic diazo compound an ortho-hydroxy carboxylic acid arylide corresponding to the general formula

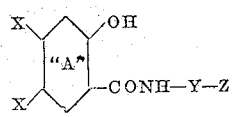

wherein Y stands for an aryl radicle of the benzene series, Z for a substituent containing a —CH₂—CO— group capable of coupling and wherein to the benzene nucleus marked "A" a nuclear system containing at least one nucleus is attached in the positions marked X.

2. The process of producing water-insoluble azo dyestuffs which comprises coupling in an alkaline medium with an aromatic diazo compound an ortho-hydroxy carboxylic acid arylide corresponding to the general formula

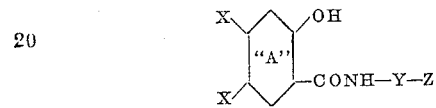

wherein Y stands for an aryl radicle of the benzene series, Z for a substituent containing a —CH₂—CO— group capable of coupling and wherein to the benzene nucleus marked "A" a nuclear system containing at least one nucleus is attached in the positions marked X.

3. The process of producing water-insoluble azo dyestuffs which comprises coupling with an aromatic diazo compound a 2,3-hydroxynaphthoic acid arylide with an aryl radicle of the benzene series to which radicle a substituent is attached which contains a —CH₂—CO— group capable of coupling.

4. Water-insoluble azo dyestuffs corresponding to the general formula

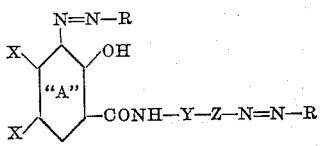

wherein Y stands for an aryl radicle of the benzene series, Z for a substituent containing a —CH₂—CO— group capable of coupling, wherein to the benzene nucleus marked "A" a nuclear system containing at least one nucleus is attached in the positions marked X, wherein R stands for an aromatic radicle and wherein the azo group attached to Z is connected with the methylene group.

5. Water-insoluble azo dyestuffs corresponding to the general formula

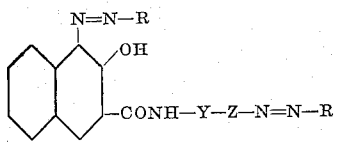

wherein Y stands for an aryl radicle of the benzene series, Z for a substituent containing a —CH₂—CO— group capable of coupling, wherein R stands for an aromatic radicle and wherein the azo group attached to Z is connected with the methylene group.

6. The water-insoluble azo dyestuff corresponding to the formula

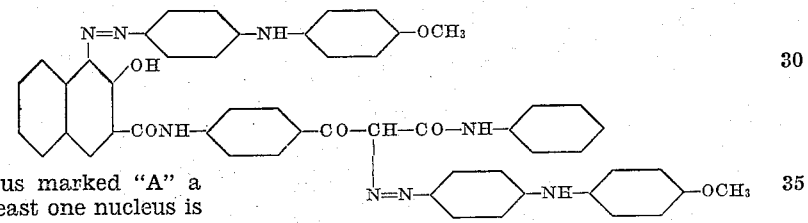

7. The water-insoluble azo dyestuff corresponding to the formula

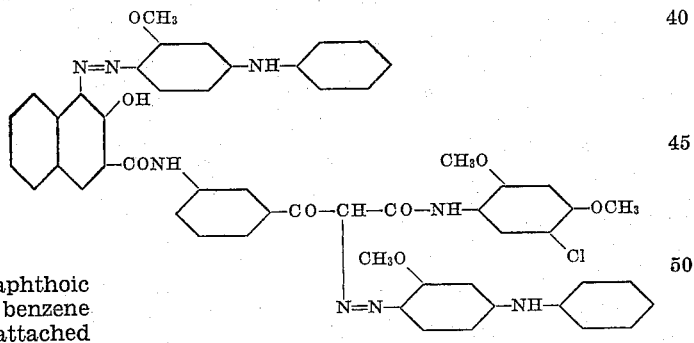

8. The water-insoluble azo dyestuff corresponding to the formula

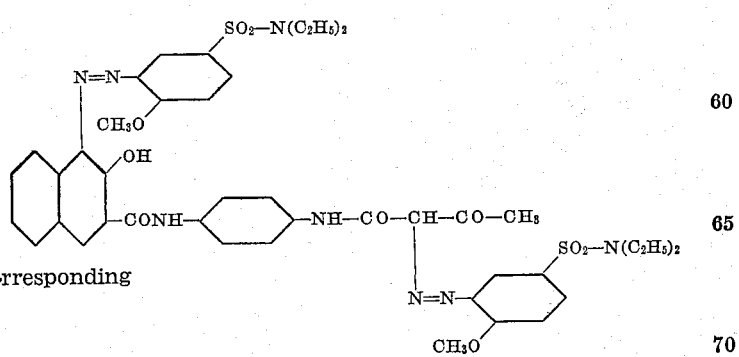

9. Fibres dyed with the dyestuffs according to claim 4.

10. Fibres dyed with the dyestuffs according to claim 5.

11. Fibres dyed with the dyestuff according to claim 6.

12. Fibres dyed with the dyestuff according to claim 7.

13. Fibres dyed with the dyestuff according to claim 8.

HANS KRZIKALLA.
BERNHARD EISTERT.
ROBERT SCHMITT.
HERBERT KRACKER.